(12) United States Patent
Sasagawa et al.

(10) Patent No.: US 10,809,859 B2
(45) Date of Patent: Oct. 20, 2020

(54) CAPACITIVE SENSOR

(71) Applicant: Alps Alpine Co., Ltd., Tokyo (JP)

(72) Inventors: Hideto Sasagawa, Niigata-ken (JP);
Takashi Asakawa, Niigata-ken (JP);
Takefumi Osaka, Niigata-ken (JP);
Yutaka Takashima, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 163 days.

(21) Appl. No.: 16/129,684

(22) Filed: Sep. 12, 2018

(65) Prior Publication Data

US 2019/0025961 A1 Jan. 24, 2019

Related U.S. Application Data

(63) Continuation of application No. PCT/JP2017/007879, filed on Feb. 28, 2017.

(30) Foreign Application Priority Data

Apr. 4, 2016 (JP) .................................. 2016-074952

(51) Int. Cl.
*G06F 3/044* (2006.01)
*G06F 3/041* (2006.01)
*B32B 7/02* (2019.01)
*B32B 7/12* (2006.01)
(Continued)

(52) U.S. Cl.
CPC ................. *G06F 3/044* (2013.01); *B32B 7/02* (2013.01); *B32B 7/12* (2013.01); *B32B 27/08* (2013.01);
(Continued)

(58) Field of Classification Search
CPC ...................... G06F 3/044; G06F 3/041; G06F 2203/04103; G06F 2203/04107;
(Continued)

(56) References Cited

U.S. PATENT DOCUMENTS 6,169,316 B1 * 1/2001 Sakai ..................... G01L 19/146
257/417
7,170,185 B1 * 1/2007 Hogerton .............. H01L 21/563
257/738

(Continued)

FOREIGN PATENT DOCUMENTS

JP 2011-53262 3/2011
JP 2015-172921 10/2015

OTHER PUBLICATIONS

International Search Report from International Application No. PCT/JP2017/007879 dated May 16, 2017.

*Primary Examiner* — Daniel R Miller
(74) *Attorney, Agent, or Firm* — Beyer Law Group LLP

(57) ABSTRACT

A capacitive sensor includes: a resinous panel that has a translucent property, a main surface of the panel being a manipulation surface; a sensor substrate placed so as to face another main surface of the panel, the other main surface being opposite to the manipulation surface of the panel, the sensor substrate having a glass base material and a transparent electrode provided on at least one main surface of the base material; an intermediate layer that has a translucent property, the intermediate layer being disposed between the panel and the sensor substrate; a first adhesive layer disposed between the panel and the intermediate layer, the first adhesive layer bonding the panel and the intermediate layer together; and a second adhesive layer disposed between the sensor substrate and the intermediate layer, the second adhesive layer bonding the sensor substrate and the intermediate layer together.

6 Claims, 10 Drawing Sheets

(51) Int. Cl.
*B32B 27/08* (2006.01)
*B32B 27/36* (2006.01)
(52) U.S. Cl.
CPC ............ *B32B 27/365* (2013.01); *G06F 3/041* (2013.01); *B32B 2307/202* (2013.01); *B32B 2307/412* (2013.01); *B32B 2307/414* (2013.01); *B32B 2457/208* (2013.01); *G06F 2203/04103* (2013.01); *G06F 2203/04107* (2013.01); *G06F 2203/04111* (2013.01)
(58) Field of Classification Search
CPC ... G06F 2203/04111; B32B 7/02; B32B 7/12; B32B 27/08; B32B 27/365; B32B 2307/202; B32B 2307/412; B32B 2307/414; B32B 2457/208
See application file for complete search history.

(56) References Cited

U.S. PATENT DOCUMENTS

| | | | |
|---|---|---|---|
| 2007/0235861 A1* | 10/2007 | Chien | H01L 21/4871 257/712 |
| 2013/0164478 A1* | 6/2013 | Yamamoto | B32B 27/325 428/41.8 |
| 2014/0065389 A1* | 3/2014 | Loy | H01L 29/78636 428/214 |
| 2014/0078508 A1* | 3/2014 | Aota | H04B 10/677 356/450 |
| 2015/0232707 A1 | 8/2015 | Yoon et al. | |
| 2016/0162076 A1 | 6/2016 | Fukagawa et al. | |

\* cited by examiner

FIG. 1
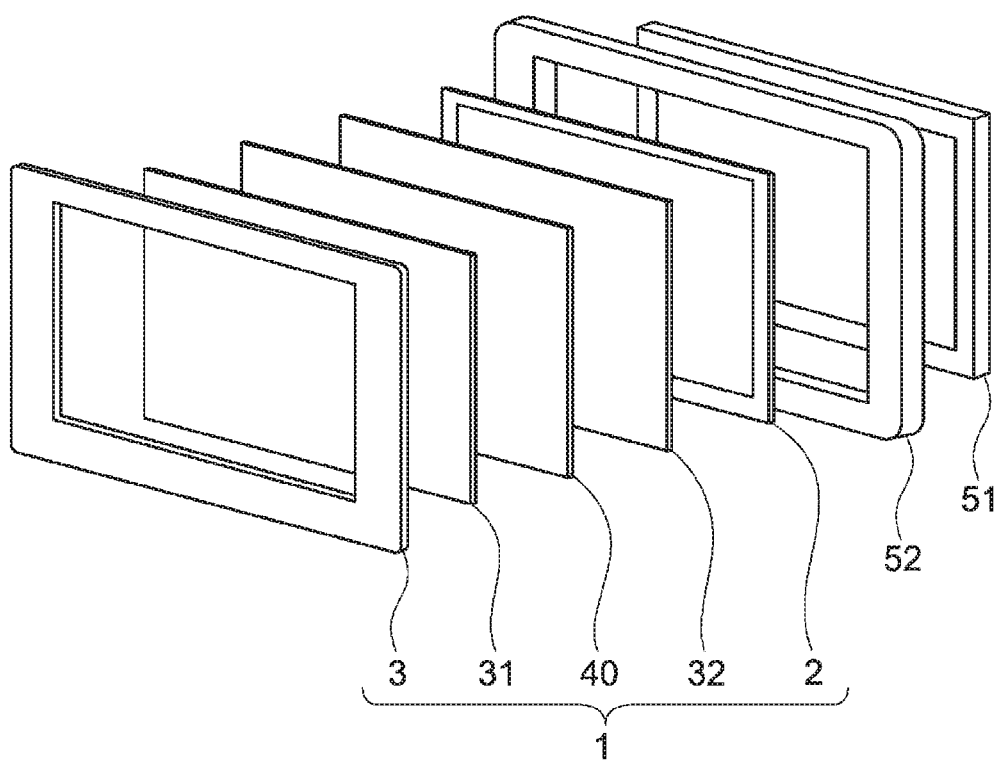
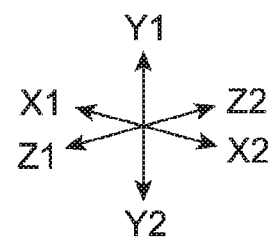

FIG. 6

| MEMBER NAME | MATERIAL | THICKNESS (mm) | YOUNG'S MODULUS (Pa) | POISSON'S RATIO | LINEAR EXPANSION COEFFICIENT (/°C) |
|---|---|---|---|---|---|
| PANEL | PC | 1 | $2.45 \times 10^9$ | 0.38 | $7.00 \times 10^{-5}$ |
| FIRST ADHESIVE LAYER | ACRYLIC ADHESIVE | 0.1 | $9.90 \times 10^5$ | 0.45 | $7.00 \times 10^{-5}$ |
| INTERMEDIATE LAYER | PET | 0.05 | $6.20 \times 10^9$ | 0.21 | $2.00 \times 10^{-5}$ |
| SECOND ADHESIVE LAYER | ACRYLIC ADHESIVE | 0.1 | $9.90 \times 10^5$ | 0.45 | $7.00 \times 10^{-5}$ |
| SENSOR SUBSTRATE (BASE MATERIAL) | $SiO_2$ | 0.7 | $8.01 \times 10^{10}$ | 0.27 | $8.00 \times 10^{-6}$ |

| MEMBER NAME | STRESS (MPa) | REDUCTION RATIO (%) |
|---|---|---|
| FIRST ADHESIVE LAYER | 0.785 | 12.0 |
| SECOND ADHESIVE LAYER | 0.670 | 24.9 |
| COMPARATIVE EXAMPLE | 0.892 | – |

FIG. 10

| MEMBER NAME | MATERIAL | THICKNESS (mm) | YOUNG'S MODULUS (Pa) | POISSON'S RATIO | LINEAR EXPANSION COEFFICIENT (/°C) |
|---|---|---|---|---|---|
| PANEL | PC | 1 | $2.45 \times 10^9$ | 0.38 | $7.00 \times 10^{-5}$ |
| FIRST ADHESIVE LAYER | ACRYLIC ADHESIVE | 0.4 | $9.90 \times 10^5$ | 0.45 | $7.00 \times 10^{-5}$ |
| INTERMEDIATE LAYER | PET | 0.05 | $6.20 \times 10^9$ | 0.21 | $2.00 \times 10^{-5}$ |
| SECOND ADHESIVE LAYER | ACRYLIC ADHESIVE | 0.4 | $9.90 \times 10^5$ | 0.45 | $7.00 \times 10^{-5}$ |
| SENSOR SUBSTRATE (BASE MATERIAL) | $SiO_2$ | 0.7 | $8.01 \times 10^{10}$ | 0.27 | $8.00 \times 10^{-6}$ |

FIG. 11

| MEMBER NAME | STRESS (MPa) | REDUCTION RATIO (%) |
|---|---|---|
| FIRST ADHESIVE LAYER | 0.320 | 64.1 |
| SECOND ADHESIVE LAYER | 0.257 | 71.2 |
| COMPARATIVE EXAMPLE | 0.892 | — |

CAPACITIVE SENSOR

CLAIM OF PRIORITY

This application is a Continuation of International Application No. PCT/JP2017/007879 filed on Feb. 28, 2017, which claims benefit of Japanese Patent Application No. 2016-074952 filed on Apr. 4, 2016. The entire contents of each application noted above are hereby incorporated by reference.

BACKGROUND OF THE INVENTION

1. Field of the Invention

The present invention relates to a capacitive sensor, and more particularly to a capacitive sensor that has a resinous panel and a glass base material.

2. Description of the Related Art

Japanese Unexamined Patent Application Publication No. 2015-172921 discloses a laminated body, for use for a touch panel, in which an adhesive sheet is placed between a protective substrate and a capacitive touch panel sensor. The capacitive touch panel sensor described in Japanese Unexamined Patent Application Publication No. 2015-172921 has a substrate, a first detection electrode, and a second detection electrode. Examples of the substrate include a glass substrate. It is preferable for the protective substrate to be a transparent substrate. Examples of the protective substrate include a plastic plate.

Japanese Unexamined Patent Application Publication No. 2015-172921 also discloses a capacitive touch panel in which an adhesive sheet is placed between a display device and a capacitive touch panel sensor. Examples of the display device described in Japanese Unexamined Patent Application Publication No. 2015-172921 discloses include, a cathode-ray tube (CRT) display, a liquid crystal display (LCD), an organic light emitting diode (OLED) display, a vacuum fluorescent display (VFD), a plasma display panel (PDP), a surface electric field display (SED), a field emission display (FED), and electric paper (E-paper).

SUMMARY OF THE INVENTION

A capacitive touch panel may be used as a vehicle-mounted sensor as is, for example, a sensor mounted in a car navigation system. In this case, while the shape of a glass substrate placed at a position near a display device is often rectangular, the shape of a protective substrate placed at a position near a manipulation surface or the shape of a protective substrate a main surface of which is used as a manipulation surface is not limited only to a rectangular shape but may have any of other various shapes. The form of fixing the protective substrate is various.

In this situation, when environment temperature around the capacitive touch panel changes, the glass substrate and protective substrate may expand or contract in mutually different directions. Then, a shearing force is exerted on the adhesive sheet placed between the protective substrate and the capacitive touch panel sensor. If the adhesive force of the adhesive sheet to the protective substrate and capacitive touch panel sensor is low, the adhesive sheet may peel off from at least any of the protective substrate and capacitive touch panel sensor.

The present invention provides a capacitive sensor that can restrain an adhesive layer from peeling off even if a shearing force caused by, for example, a change in environment temperature is exerted on the adhesive layer.

In one aspect, a capacitive sensor in the present invention is characterized by having: a resinous panel that has a translucent property, a main surface of the panel being a manipulation surface; a sensor substrate placed so as to face another main surface of the panel, the other main surface being opposite to the manipulation surface of the panel, the sensor substrate having a glass base material and a transparent electrode provided on at least one main surface of the base material; an intermediate layer that has a translucent property, the intermediate layer being disposed between the panel and the sensor substrate; a first adhesive layer disposed between the panel and the intermediate layer, the first adhesive layer bonding the panel and the intermediate layer together; and a second adhesive layer disposed between the sensor substrate and the intermediate layer, the second adhesive layer bonding the sensor substrate and the intermediate layer together.

In the capacitive sensor described above, an intermediate layer that has a translucent property is provided between a resinous panel one main surface of which is a manipulation surface and a sensor substrate that has a glass base material and a transparent electrode. A first adhesive layer that bonds the panel and intermediate layer together is provided between the panel and the intermediate layer. A second adhesive layer that bonds the sensor substrate and intermediate layer together is also provided between the sensor substrate and the intermediate layer. That is, two adhesive layers are provided on both sides of the intermediate layer, one layer on one side.

Due to this, the intermediate layer can cause two adhesive layers to function independently on both sides of the intermediate layer. In other words, the intermediate layer can separate the adhesive layer functions by using the intermediate layer as a boundary between them. A shearing force may be exerted on members positioned between the panel and the sensor substrate because, for example, environment temperature around the capacitive sensor changes and the resinous panel and glass base material expand or contract in different directions. Even in this case, since the first adhesive layer and second adhesive layer are placed with the intermediate layer intervening between them, they can be deformed independently of each other. That is, a shearing force generated due to the displacement of the panel is mainly exerted on the first adhesive layer positioned between the panel and the intermediate layer. In this case, the first adhesive layer is deformed so as to follow a change in the relative position of the panel to the intermediate layer, so the first adhesive layer can absorb or mitigate the shearing force exerted on the first adhesive layer. Also, a shearing force generated due to the displacement of the base material is mainly exerted on the second adhesive layer positioned between the base material and the intermediate layer. In this case, the second adhesive layer is deformed so as to follow a change in the relative position of the base material of the sensor substrate to the intermediate layer, so the second adhesive layer can absorb or mitigate the shearing force exerted on the second adhesive layer. Due to this, it is possible to restrain the first adhesive layer and second adhesive layer from peeling off from the panel and base material, respectively.

In the capacitive sensor described above, the intermediate layer may be formed from a material including a resin, and the linear expansion coefficient of the intermediate layer may be larger than the linear expansion coefficient of the base material and may be smaller than the linear expansion coefficient of the panel.

In this case, the intermediate layer is formed from a material including a resin, so the intermediate layer is deformed relatively flexibly for a change in environment temperature. The linear expansion coefficient of the intermediate layer is larger than the linear expansion coefficient of the base material and is smaller than the linear expansion coefficient of the panel. Thus, the amount of expansion or contraction of the intermediate layer is between the amount of expansion or contraction of the base material and the amount of expansion or contraction of the panel. Accordingly, when the panel, intermediate layer, and base material expand or contract according to a change in environment temperature, a change of the relative position of the panel to the intermediate layer and a change of the relative position of the base material to the intermediate layer are smaller than a change in the relative position between the panel and the base material. Therefore, when compared with a case in which only an adhesive layer (contrast adhesive layer) is provided between the panel and the base material without the intermediate layer being provided, when environment temperature changes, shearing forces exerted on the first adhesive layer and second adhesive layer are lower than a shearing force exerted on the above contrast adhesive layer. Due to this, it is possible to more stably restrain the possibility that the first adhesive layer and second adhesive layer peel off from the panel and base material, respectively.

The Young's modulus of the intermediate layer may be lower than the Young's modulus of the base material and may be higher than the Young's modulus of the panel. In this case, when an external force is exerted on the whole of the capacitive sensor, the amount of distortion caused in the panel is highest, followed by intermediate layer and base material in that order. Accordingly, when an external force is exerted on the whole of the capacitive sensor and distortion is thereby generated in the members constituting the capacitive sensor in a direction along the main surface, changes in relative position caused between the panel and the intermediate layer and between the base material and the intermediate layer are smaller than a change in relative position caused between the panel and the base material. Therefore, when compared with a case in which only an adhesive layer (contrast adhesive layer) is provided between the panel and the base material without the intermediate layer being provided, when an external force is exerted on the whole of the capacitive sensor and distortion is thereby generated in the members constituting the capacitive sensor, shearing forces exerted on the first adhesive layer and second adhesive layer are lower than a shearing force exerted on the above contrast adhesive layer. Due to this, it is possible to more stably restrain the possibility that the first adhesive layer and second adhesive layer peel off from the panel and base material, respectively.

The Young's modulus of the first adhesive layer and the Young's modulus of the second adhesive layer may be lower than the Young's modulus of the panel, the Young's modulus of the base material, and the Young's modulus of the intermediate layer. In this case, since Young's modulus of the first adhesive layer and the Young's modulus of the second adhesive layer is lower than the Young's modulus of the panel, the Young's modulus of the base material, and the Young's modulus of the intermediate layer, the first adhesive layer and second adhesive layer can flexibly follow changes in relative position between the panel and the intermediate layer and between the base material and the intermediate layer, which are caused by the deformation of the panel, base material, and intermediate layer. Therefore, even if shearing forces caused by the deformation of the panel, base material, and intermediate layer are exerted on the first adhesive and second adhesive layer, these shearing forces can be appropriately absorbed or mediated in the first adhesive layer and second adhesive layer.

The first adhesive layer and the second adhesive layer may include an acrylic adhesive resin. In this case, the first adhesive layer and second adhesive layer can flexibly follow changes in relative position between the panel and the intermediate layer and between the base material and the intermediate layer, which are caused by the deformation of the panel, base material, and intermediate layer, while optical performance is secured.

The present invention provides a capacitive sensor that can restrain an adhesive layer from peeling off even if environment temperature changes.

BRIEF DESCRIPTION OF THE DRAWINGS

FIG. 1 is an exploded view representing a capacitive sensor according to an embodiment;

FIG. 6 is a table that lists members of the model in the simulation;

FIG. 10 is a table that lists members of a model in another simulation performed by the present inventor; and FIG. 11 is a table that lists an example of results in the other simulation.

DESCRIPTION OF THE PREFERRED EMBODIMENT

Figure 2:
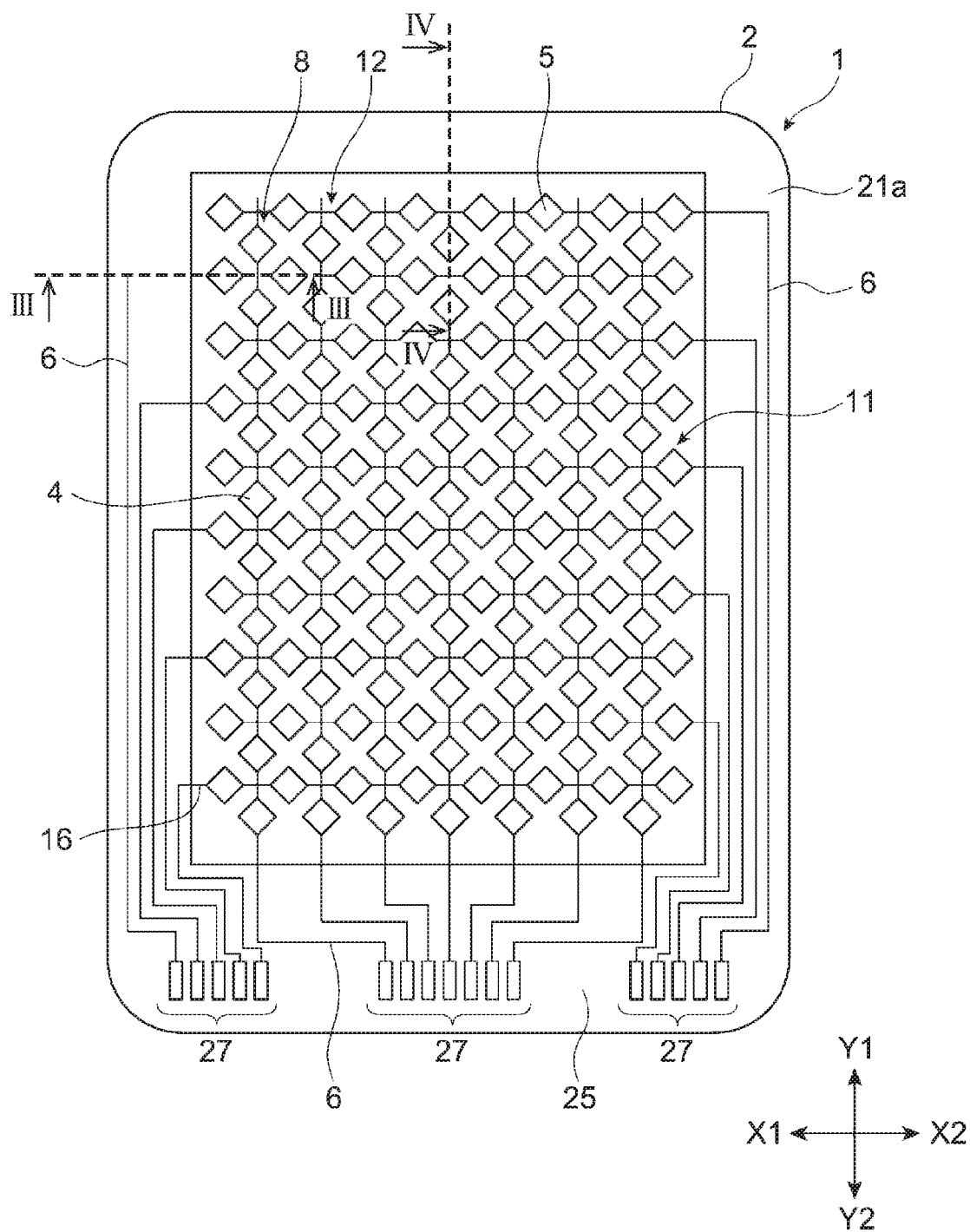
FIG. 2 is a plan view representing the structure of the capacitive sensor according to the embodiment.

An embodiment of the present invention will be described with reference to the drawings. In the drawings, like elements are assigned like reference characters and detailed descriptions will be appropriately omitted.

Figure 3:
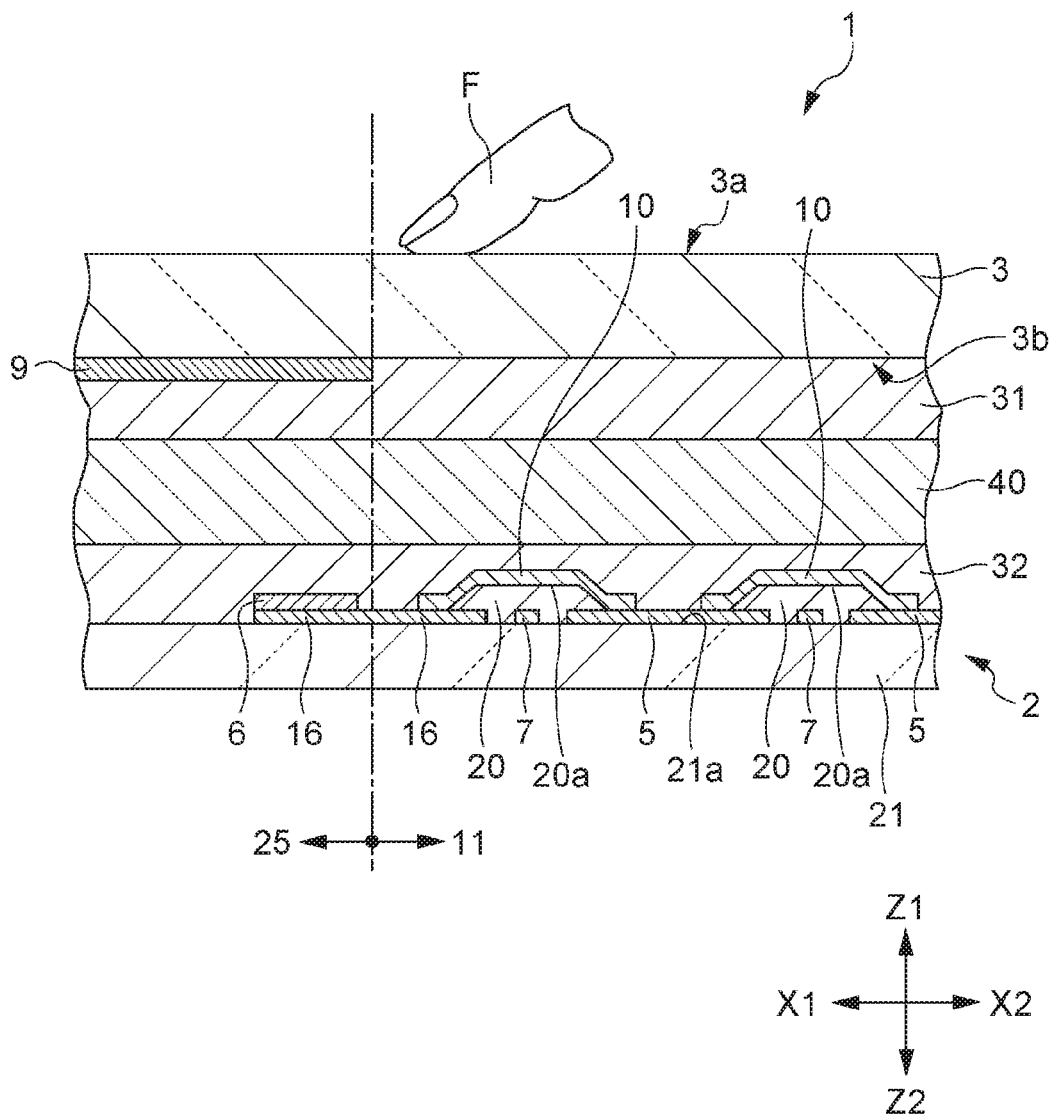
FIG. 3 is a cross-sectional view taken along line III-III indicated in FIG. 2.
Figure 4:
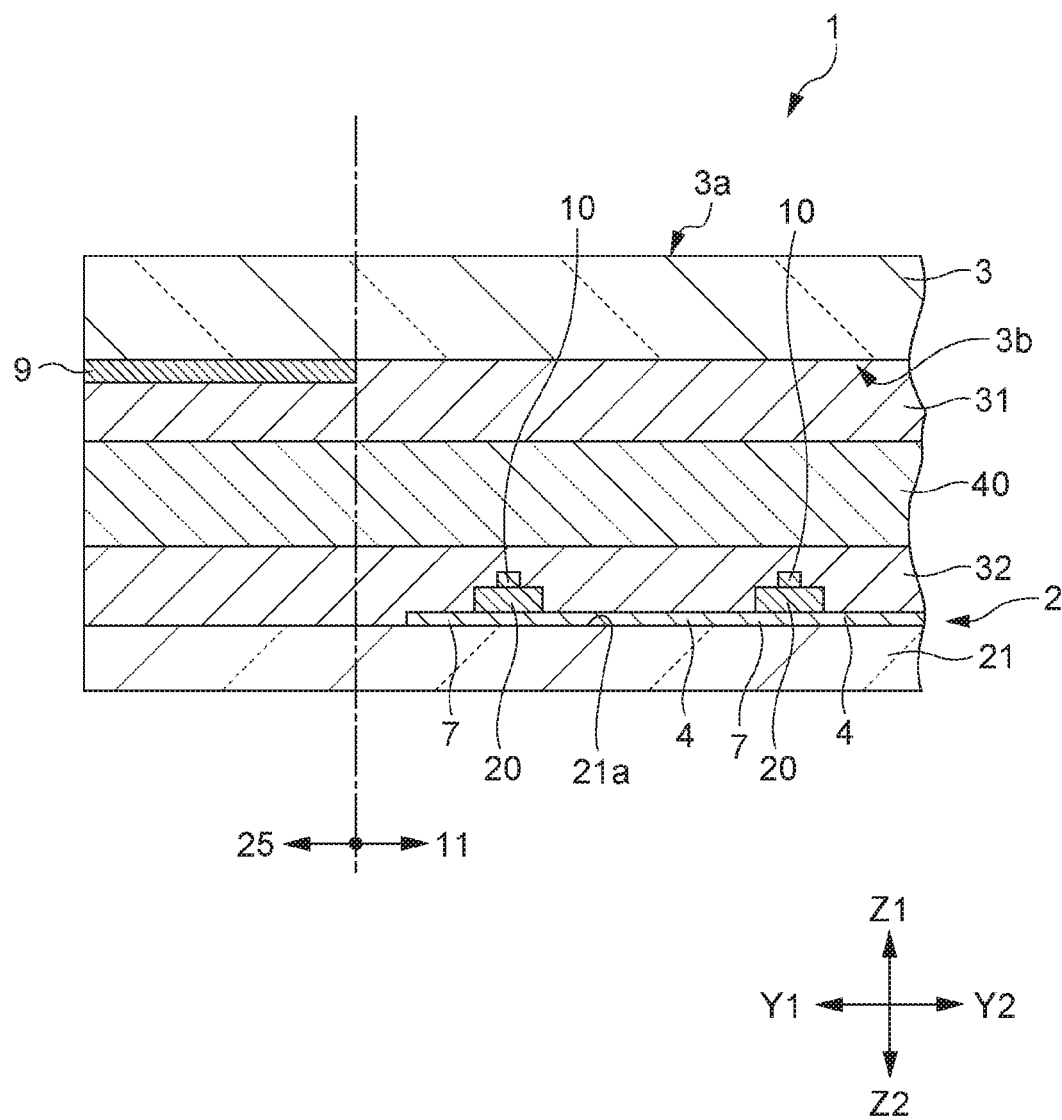
FIG. 4 is a cross-sectional view taken along line IV-IV indicated in FIG. 2.

FIG. 1 is an exploded view representing a capacitive sensor according to this embodiment. FIG. 2 is a plan view representing the structure of the capacitive sensor according to this embodiment. FIG. 3 is a cross-sectional view taken along line III-III indicated in FIG. 2. FIG. 4 is a cross-sectional view taken along line IV-IV indicated in FIG. 2. Since a transparent electrode is transparent, it cannot be viewed in reality. In FIG. 2, however, the outline shapes of transparent electrodes are illustrated for easy understanding.

In this application, "transparency" and "translucent property" indicate a state in which visible light transmittance is 50% or higher (preferably, 80% or higher). Furthermore, it is preferable for the haze value to be 6% or lower. In this application, "light shielding" and "light shielding property" indicate a state in which visible light transmittance is lower than 50% (preferably, lower than 20%).

As illustrated in FIG. 1, the capacitive sensor 1 according to this embodiment has a sensor substrate 2, a panel 3, an intermediate layer 40, a first adhesive layer 31, and a second adhesive layer 32. The panel 3, which has a translucent property, is formed from, for example, a material including a resin such as polycarbonate (PC).

The sensor substrate 2 is disposed at a distance from the panel 3. Specifically, the sensor substrate 2 is disposed at, for example, a position close to a display device 51 such as a liquid crystal display or an organic electroluminescence (EL) device when viewed from the panel 3, and is attached to a case 52 or the like that holds the display device 51. The sensor substrate 2, which is referred to as, for example, a glass sensor, has a base material 21 (see FIG. 3) made of glass and transparent electrodes. The sensor substrate 2 will be described later in detail.

The intermediate layer 40 is disposed between the panel 3 and the sensor substrate 2. The intermediate layer 40, which has a translucent property, is preferably formed from, for example, a material including a resin such as polyethylene terephthalate (PET). The linear expansion coefficient of the intermediate layer 40 is preferably larger than the linear expansion coefficient of the base material 21 of the sensor substrate 2 and is preferably smaller than the linear expansion coefficient of the panel 3. The Young's modulus of the intermediate layer 40 is preferably lower than the Young's modulus of the base material 21 of the sensor substrate 2 and is preferably higher than the Young's modulus of the panel 3.

The first adhesive layer 31 is disposed between the panel 3 and the intermediate layer 40 and bonds the panel 3 and intermediate layer 40 together. The second adhesive layer 32 is disposed between the sensor substrate 2 and the intermediate layer 40 and bonds the sensor substrate 2 and intermediate layer 40 together. The Young's modulus of the first adhesive layer 31 and the Young's modulus of the second adhesive layer 32 are preferably lower than the Young's modulus of the panel 3, the Young's modulus of the base material 21 of the sensor substrate 2, and the Young's modulus of the intermediate layer 40. Each of the first adhesive layer 31 and second adhesive layer 32 is an optical clear adhesive (OCA) layer and is preferably composed of, for example, an adhesive layer including an acrylic adhesive, a double-sided adhesive tape, or the like.

As illustrated in FIGS. 2 to 4, the capacitive sensor 1 is composed of a detection area 11 and a non-detection area 25 when viewed from a direction (Z1-Z2 direction) along the normal of a surface of the panel 3. On the detection area 11, a manipulation can be performed with a manipulation body such as a finger F. The non-detection area 25, shaped like a picture frame, is positioned outside the outer circumference of the detection area 11. The non-detection area 25 is light-shielded by a decorative layer 9 described later. In the capacitive sensor 1, light (exemplified by external light) that propagates from a surface of the panel 3 toward a surface of the sensor substrate 2 and light (exemplified by light from a backlight of the display device 51 used in combination with the capacitive sensor 1) that propagates from the surface of the sensor substrate 2 toward the surface of the panel 3 are less likely to pass through the non-detection area 25.

The sensor substrate 2 in this embodiment has the base material 21, first electrode strings 8, and second electrode strings 12.

The first electrode strings 8 are placed in the detection area 11. Each first electrode string 8 has a plurality of first transparent electrodes 4. As illustrated in FIG. 4, the plurality of first transparent electrodes 4 are disposed on a main surface (sometimes simply referred to below as the front surface) 21a, which is one of the main surfaces of the base material 21 and is positioned on the Z1 side, the normal of the main surfaces being along the Z1-Z2 direction. The first transparent electrodes 4 are linked through elongated linking parts 7 in the Y1-Y2 direction (first direction). The first electrode strings 8, each of which has a plurality of first transparent electrodes 4 linked in the Y1-Y2 direction, are arranged in the X1-X2 direction at intervals.

The first transparent electrode 4 and linking part 7 are formed from a transparent conductive material such as an indium tin oxide (ITO) material by sputtering, evaporation, or the like. Besides the ITO material, transparent conductive materials include metal nanowires typified by silver nanowires, thin metals formed in a mesh shape, and conductive polymers. This is also true for transparent conductive materials described later.

The second electrode strings 12 are placed in the detection area 11. Each second electrode string 12 has a plurality of second transparent electrodes 5. As illustrated in FIG. 3, the plurality of second transparent electrodes 5 are disposed on the front surface 21a of the base material 21. Thus, the second transparent electrodes 5 are disposed on the same surface (front surface 21a of the base material 21) as the first transparent electrodes 4. As illustrated in FIGS. 3 and 4, the second transparent electrodes 5 are linked through elongated bridge wires 10 in the X1-X2 direction (second direction). The second electrode strings 12, each of which has a plurality of second transparent electrodes 5 linked in the X1-X2 direction, are arranged in the Y1-Y2 direction at intervals. The X1-X2 direction crosses the Y1-Y2 direction. For example, the X1-X2 direction perpendicularly crosses the Y1-Y2 direction.

The second transparent electrode 5 is formed from a transparent conductive material such as an ITO material by sputtering, evaporation, or the like. The bridge wire 10 is formed from a transparent conductive material such as an ITO material. Alternatively, the bridge wire 10 may have a first layer including a transparent conductive material such as an ITO material and a second layer composed of a metal that has a lower resistance than the first layer and is transparent. If the bridge wire 10 has a laminated structure composed of the first layer and second layer, it is preferable for the second layer to be formed from any one selected from a group of Au, an Au alloy, CuNi, and Ni. Of these, Au is more preferably selected. If the second layer is formed from Au, the bridge wire 10 can obtain a superior resistance to an environment (moisture resistance and heat resistance).

As illustrated in FIGS. 3 and 4, an insulative layer 20 is provided on the front surface of the linking part 7, which links first transparent electrodes 4. As illustrated in FIG. 3, the insulative layer 20 fills space between the linking part 7 and the second transparent electrode 5 and also slightly rides on the front surface of the second transparent electrode 5. As the insulative layer 20, a novolak resin (resist), for example, is used.

As illustrated in FIGS. 3 and 4, the bridge wire 10 is disposed so as to extend from the front surface 20a of the insulative layer 20 to the front surfaces of the second transparent electrodes 5 positioned at both sides of the insulative layer 20 in the X1-X2 direction. The bridge wire 10 electrically connects second transparent electrodes 5.

As illustrated in FIGS. 3 and 4, the insulative layer 20 is disposed on the front surface of the linking part 7, which links first transparent electrodes 4, and the bridge wire 10, which connects second transparent electrode 5, is disposed on the front surface of the insulative layer 20. Thus, the insulative layer 20 is present between the linking part 7 and the bridge wire 10, so the first transparent electrode 4 and second transparent electrode 5 are electrically insulated from each other. Since, in this embodiment, the first transparent electrode 4 and second transparent electrode 5 are disposed on the same surface (front surface 21a of the base material 21), the capacitive sensor 1 can be thinned.

The linking part 7, insulative layer 20, and bridge wire 10, which are all positioned in the detection area 11, have a translucent property as is the first transparent electrode 4 and second transparent electrode 5.

As illustrated in FIG. 2, a plurality of wiring parts 6 led out from the first electrode strings 8 and second electrode strings 12 are formed in the non-detection area 25. Each of the first electrode string 8 and second electrode string 12 is electrically connected to the wiring part 6 through a connection wire 16. As illustrated in FIG. 2, each wiring part 6 is connected to an external connection part 27 that is electrically connected to a flexible printed circuit board. That is, each wiring part 6 electrically connects the first electrode string 8, second electrode string 12, and external connection part 27. The external connection part 27 is electrically connected to the flexible printed circuit board through, for example, a conductive paste.

Each wiring part 6 is formed from a material that has a metal such as Cu, a Cu alloy, a CuNi alloy, Ni, Ag, Au, or the like. The connection wire 16, which is formed from a transparent conductive material such as an ITO material, extends from the detection area 11 to the non-detection area 25. The wiring part 6 is laminated on the connection wire 16 in the non-detection area 25 and is electrically connected to the connection wire 16.

As illustrated in FIGS. 3 and 4, the wiring part 6 is disposed in the non-detection area 25 on the front surface 21a of the base material 21. The external connection part 27 is also disposed in the non-detection area 25 on the front surface 21a of the base material 21, as is the wiring part 6.

Although, in FIG. 2, the wiring part 6 and external connection part 27 are illustrated so as to be viewed for easy understanding, the panel 3 is disposed so as to face the front surface 21a of the base material 21 in practice, as illustrated in FIGS. 3 and 4. Of the main surfaces of the panel 3, their normal being along the Z1-Z2 direction, a main surface (opposite to a main surface 3b facing the front surface 21a of the base material 21) 3a positioned on the Z1 side is on a side on which the capacitive sensor 1 is manipulated. Therefore, the manipulation surface 3a is also referred to as the manipulation surface in this description.

The panel 3 may have a laminated structure. Specific examples of laminated structures include a laminated structure in which a hard coat layer formed from an inorganic material is formed on a film formed from an organic material. The shape of the panel 3 may be a flat-plate-like shape or may be another shape. For example, the manipulation surface 3a of the panel 3 may be a curved surface. The manipulation surface 3a and main surface 3b of the panel 3 may have different shapes; of the main surfaces of the panel 3 that have a normal along the Z1-Z2 direction, the main surface 3b is positioned on the Z2 side (in other words, the main surface 3b is opposite to the manipulation surface 3a, so the main surface 3b may also be referred to below as the rear surface).

The decorative layer 9 that has a shielding property is disposed in the non-detection area 25 on the rear surface 3b of the panel 3. In the capacitive sensor 1 according to this embodiment, the decorative layer 9 is disposed in the whole of the non-detection area 25 on the rear surface 3b of the panel 3. Therefore, the wiring parts 6 and external connection parts 27 are hidden by the decorative layer 9 and are not viewed when the capacitive sensor 1 is viewed from the same side as the manipulation surface 3a of the panel 3. The material of the decorative layer 9 is any material if it has a shielding property. The decorative layer 9 may have an insulation property.

With the capacitive sensor 1 illustrated in FIG. 1, when the finger F used as an example of a manipulation body comes into contact with the manipulation surface 3a of the panel 3 as illustrated in FIG. 3, a capacitance is generated between the finger F and the first transparent electrode 4 close to the finger F and between the finger F and the second transparent electrode 5 close to the finger F. The capacitive sensor 1 can calculate the contact position of the finger F according to a change in capacitance at that time. Specifically, the capacitive sensor 1 detects the X coordinate of the position of the finger F according to a change in capacitance between the finger F and the first electrode string 8 and detects the Y coordinate of the position of the finger F according to a change in capacitance between the finger F and the second electrode string 12 (the capacitive sensor 1 is of self-capacitance detection type).

Alternatively, the capacitive sensor 1 may be of mutual capacitance detection type. Specifically, the capacitive sensor 1 may apply a driving voltage to any one of the first electrode string 8 and second electrode string 12, and may detect a change in capacitance between the finger F and the other of the first electrode string 8 and the second electrode string 12. Due to this, the capacitive sensor 1 detects the X direction of the position of the finger F from one electrode string and also detects the Y coordinate of the position of the finger F from the other electrode string.

The placement of the first transparent electrodes 4 and second transparent electrodes 5 illustrated in FIGS. 2 to 4 is just an example and is not limited only to this. The capacitive sensor 1 is only required to be capable of detecting a change in capacitance between a manipulation body such as the finger F and a transparent electrode and calculating a position at which the manipulation body is in contact with the manipulation surface 3a. For example, the first transparent electrodes 4 and second transparent electrodes 5 may be disposed on the different main surfaces of the base material 21.

As with, for example, a sensor mounted in a car navigation system, the capacitive sensor 1 may be used as a vehicle-mounted sensor. In this case, the shape of the base material 21 of the sensor substrate 2 placed near the display device 51 is often rectangular when viewed from the panel 3. By contrast, the shape of the panel 3, a main surface of which is the manipulation surface 3a, is not limited only to a rectangular shape but may have any of other various shapes, depending on, for example, the shape of the instrument panel of the vehicle. The form of fixing the panel 3 is also various.

Thus, when environment temperature around the capacitive sensor 1 changes, the base material 21 and panel 3 may expand or contract in mutually different directions. If one adhesive layer is provided between the base material 21 and the panel 3, a shearing force is exerted on the adhesive layer. In this case, if the adhesive force of the adhesive layer to the base material 21 and panel 3 is low, the adhesive layer cannot follow at least any of the expansion and contraction of the base material 21 and panel 3, so the adhesive layer may peel off from at least any of the base material 21 and panel 3.

In contrast to this, in the capacitive sensor 1 according to this embodiment, the intermediate layer 40 is provided between the panel 3 and the sensor substrate 2, specifically between the panel 3 and the base material 21. In addition, the first adhesive layer 31, which bonds the panel 3 and intermediate layer 40 together, is provided between the panel 3 and the intermediate layer 40. The second adhesive layer 32, which bonds the sensor substrate 2 and intermediate layer 40 together, is provided between the sensor substrate 2 and the intermediate layer 40, specifically between the base material 21 and the intermediate layer 40. Specifically, two adhesive layers (first adhesive layer 31 and second adhesive layer 32) are provided on both sides of the intermediate layer 40, one layer on one side.

Due to this, the intermediate layer 40 can cause the first adhesive layer 31 and second adhesive layer 32 to function independently on both sides of the intermediate layer 40. In other words, the intermediate layer 40 can separate the adhesive layer functions as the first adhesive layer 31 and second adhesive layer 32 by using the intermediate layer 40 as a boundary between them. A shearing force may be exerted on members positioned between the panel 3 and the sensor substrate 2 because, for example, environment temperature around the capacitive sensor 1 changes and the resinous panel 3 and glass base material 21 expand or contract in different directions. Even in this case, since the first adhesive layer 31 and second adhesive layer 32 are placed with the intermediate layer 40 intervening between them, they can be deformed independently of each other. That is, a shearing force generated due to the displacement of the panel 3 is mainly exerted on the first adhesive layer 31 positioned between the panel 3 and the intermediate layer 40. In this case, the first adhesive layer 31 is deformed so as to follow a change in the relative position of the panel 3 to the intermediate layer 40, so the first adhesive layer 31 can absorb or mitigate the shearing force exerted on the first adhesive layer 31. Also, a shearing force generated due to the displacement of the base material 21 of the sensor substrate 2 is mainly exerted on the second adhesive layer 32 positioned between the base material 21 of the sensor substrate 2 and the intermediate layer 40. In this case, the second adhesive layer 32 is deformed so as to follow a change in the relative position of the base material 21 of the sensor substrate 2 to the intermediate layer 40, so the second adhesive layer 32 can absorb or mitigate the shearing force exerted on the second adhesive layer 32. Due to this, even if a searing force caused by a change in environment temperature or the like is exerted on the first adhesive layer 31 and second adhesive layer 32, it is possible to restrain the first adhesive layer 31 and second adhesive layer 32 from peeling off from the panel 3 and base material 21, respectively.

Since the intermediate layer 40 is formed from a material including a resin, the intermediate layer 40 can be deformed relatively flexibly in response to a change in environment temperature. As described above, the linear expansion coefficient of the intermediate layer 40 is larger than the linear expansion coefficient of the base material 21 and is smaller than the linear expansion coefficient of the panel 3. Thus, the amount of expansion or contraction of the intermediate layer 40 is between the amount of expansion or contraction of the base material 21 and the amount of expansion or contraction of the panel 3. Accordingly, when the panel 3, intermediate layer 40, and base material 21 expand or contract according to a change in environment temperature, a change of the relative position of the panel 3 to the intermediate layer 40 and a change of the relative position of the base material 21 to the intermediate layer 40 are smaller than a change in the relative position between the panel 3 and the base material 21. Therefore, when compared with a case in which only an adhesive layer (contrast adhesive layer) is provided between the panel 3 and the base material 21 without the intermediate layer 40 being provided, when environment temperature changes, shearing forces exerted on the first adhesive layer 31 and second adhesive layer 32 are lower than a shearing force exerted on the above contrast adhesive layer. Due to this, it is possible to more stably restrain the possibility that the first adhesive layer 31 and second adhesive layer 32 peel off from the panel 3 and base material 21, respectively.

As described above, the Young's modulus of the intermediate layer 40 is lower than the Young's modulus of the base material 21 and is higher than the Young's modulus of the panel 3. Therefore, when an external force is exerted on the whole of the capacitive sensor 1, the amount of distortion caused in the panel 3 is highest, followed by intermediate layer 40 and base material 21 in that order. Accordingly, when an external force is exerted on the whole of the capacitive sensor 1 and distortion is thereby generated in the members constituting the capacitive sensor 1 in a direction along the main surface, changes in relative position caused between the panel 3 and the intermediate layer 40 and between the base material 21 and the intermediate layer 40 are smaller than a change in relative position caused between the panel 3 and the base material 21. Therefore, when compared with a case in which only an adhesive layer (contrast adhesive layer) is provided between the panel 3 and the base material 21 without the intermediate layer 40 being provided, when an external force is exerted on the whole of the capacitive sensor 1 and distortion is thereby generated in the members constituting the capacitive sensor 1, shearing forces exerted on the first adhesive layer 31 and second adhesive layer 32 are lower than a shearing force exerted on the above contrast adhesive layer. Due to this, it is possible to more stably restrain the possibility that the first adhesive layer 31 and second adhesive layer 32 peel off from the panel 3 and base material 21, respectively.

As described above, the Young's modulus of the first adhesive layer 31 and the Young's modulus of the second adhesive layer 32 are lower than the Young's modulus of the panel 3, the Young's modulus of the base material 21, and the Young's modulus of the intermediate layer 40. Therefore, the first adhesive layer 31 and second adhesive layer 32 can flexibly follow changes in relative position between the panel 3 and the intermediate layer 40 and between the base material 21 and the intermediate layer 40, which are caused by the deformation of the panel 3, base material 21, and intermediate layer 40. Therefore, even if shearing forces caused by the deformation of the panel 3, base material 21, and intermediate layer 40 are exerted on the first adhesive layer 31 and second adhesive layer 32, these shearing forces can be appropriately absorbed or mediated in the first adhesive layer 31 and second adhesive layer 32.

Furthermore, if the first adhesive layer 31 and second adhesive layer 32 include an acrylic adhesive resin, the first adhesive layer 31 can flexibly follow a change in relative position caused by the deformations of the panel 3 and intermediate layer 40 between the panel 3 and the intermediate layer 40 and the second adhesive layer 32 can flexibly follow a change in relative position caused by the deformation of the intermediate layer 40 and base material 21 between the base material 21 and the intermediate layer 40, without losing optical performance (such as, for example, appropriate permeability and refractive index).

Next, a simulation performed by the present inventor will be described with reference to the drawings.

Figure 5:
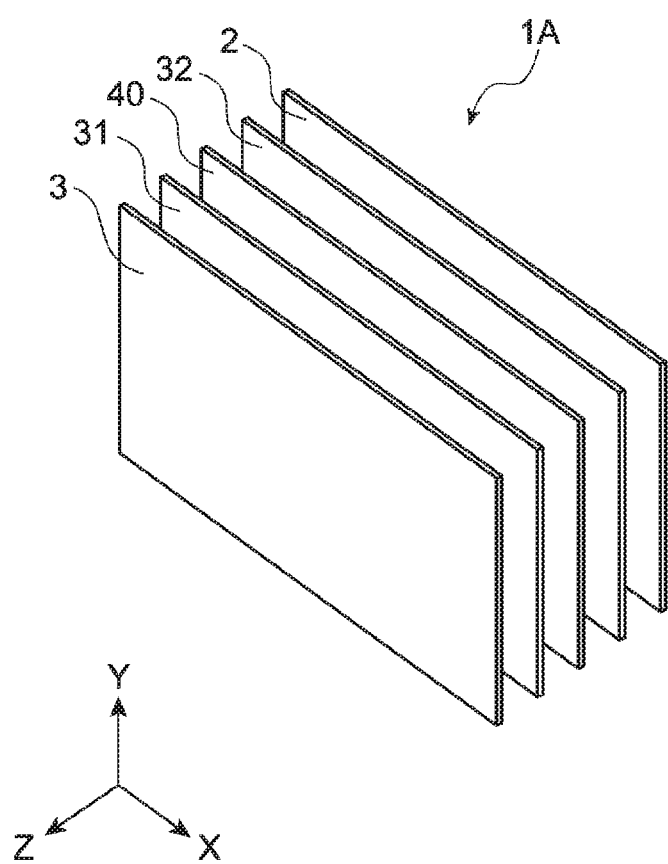
FIG. 5 is an exploded view representing a model in a simulation performed by the present inventor.
Figure 7A:
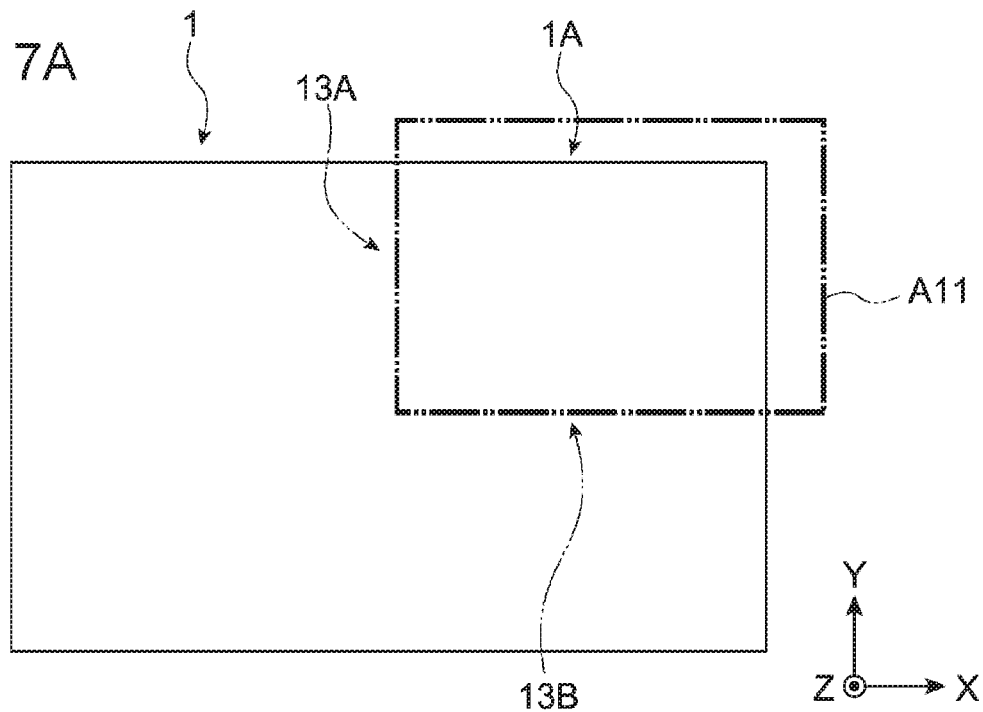
FIGS. 7A and 7B explain constraint conditions in the simulation.
Figure 7B:
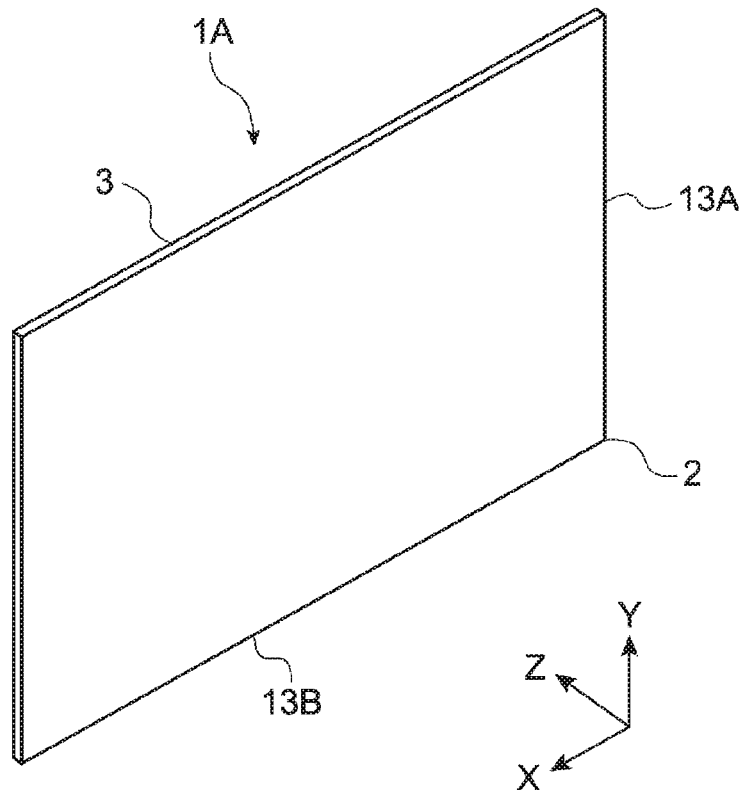
Figures 8, 9:
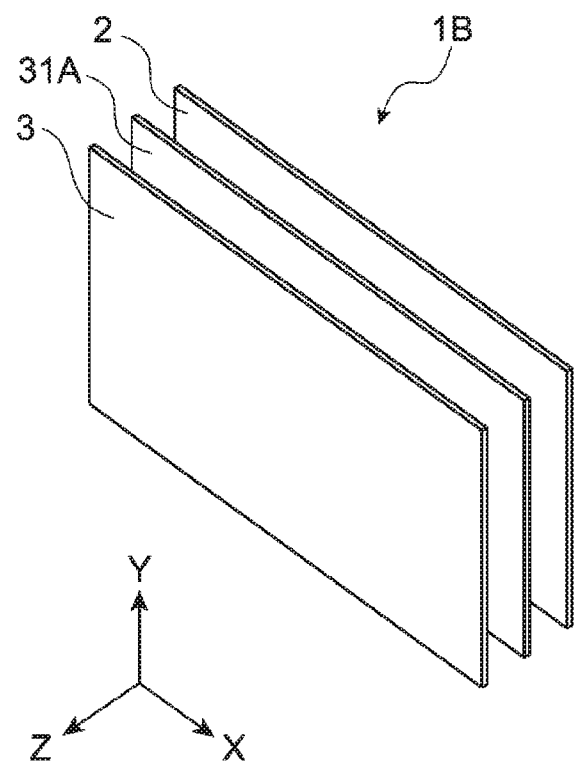
FIG. 8 is a table that lists an example of results in the simulation.
FIG. 9 is an exploded view representing a model according to a comparative example.

FIG. 5 is an exploded view representing a model in the simulation executed by the present inventor. FIG. 6 is a table that lists members of the model in this simulation. FIGS. 7A and 7B explain constraint conditions in the simulation. FIG. 8 is a table that lists an example of results in the simulation. FIG. 9 is an exploded view representing a model according to a comparative example. FIG. 7A is a plan view representing an area used in the simulation. FIG. 7B is a perspective view representing a one-fourth model used in the simulation.

The present inventor performed a simulation related to the capacitive sensor 1 according to this embodiment. That is, the present inventor confirmed, from the simulation, stress exerted on the first adhesive layer 31 and second adhesive layer 32 when environment temperature around the capacitive sensor 1 was raised from 20° C. to 95° C.

As illustrated in FIG. 5, a model 1A, used in this simulation, of the capacitive sensor 1 has the sensor substrate 2, panel 3, intermediate layer 40, first adhesive layer 31, and second adhesive layer 32. The material, thickness (in millimeters (mm)), Young's modulus (in pascals (Pa)), Poisson's ratio, and linear expansion coefficient (in/° C.) of the members of the model 1A are as in the table indicated in FIG. 6.

That is, the material of the panel 3 is polycarbonate (PC). The material of the first adhesive layer 31 and second adhesive layer 32 is an acrylic adhesive. The material of the intermediate layer 40 is polyethylene terephthalate (PET). The material of the base material 21 of the sensor substrate 2 is $SiO_2$.

The thickness of the panel 3 is 1 mm. The thickness of each of the first adhesive layer 31 and second adhesive layer 32 is 0.1 mm. The thickness of the intermediate layer 40 is 0.05 mm. The thickness of the base material 21 is 0.7 mm.

The linear expansion coefficient ($2\times10^{-5}$) of the intermediate layer 40 is larger than the linear expansion coefficient ($8\times10^{-6}$) of the base material 21 and is smaller than the linear expansion coefficient ($7\times10^{-5}$) of the panel 3. The Young's modulus ($6.2\times10^9$) of the intermediate layer 40 is lower than the Young's modulus ($8.01\times10^{10}$) of the base material 21 and is higher than the Young's modulus ($2.45\times10^9$) of the panel 3. The Young's modulus ($9.9\times10^5$) of the first adhesive layer 31 and the Young's modulus of second adhesive layer 32 are lower than the Young's modulus ($2.45\times10^9$) of the panel 3, the Young's modulus ($8.01\times10^{10}$) of the base material 21, and the Young's modulus ($6.2\times10^9$) of the intermediate layer 40.

In this simulation, the direction along the normal of the main surfaces of the panel 3 or base material 21 was the Z direction. One of the directions along the main surfaces of the panel 3 or base material 21 was the X direction, and the direction perpendicular to the Z direction and X direction was the Y direction.

As in an area A11 illustrated in FIG. 7A, a simulation was performed by using a one-fourth model 1A of the capacitive sensor 1. As illustrated in FIG. 7B, in this simulation, the base material 21 of the sensor substrate 2 was constrained in the Z direction. Cross sections 13A of the area A11 along the Y direction were symmetrically constrained in the X direction. Cross sections 13B of the area A11 along X direction were symmetrically constrained in the Y direction.

Under the conditions of each member and constraints as described above, a temperature load was given to the model 1A by raising environment temperature from 20° C. to 95° C. while warp due to the thermal expansion of each member was suppressed. It was assumed that thermal expansion occurs. An example of results in this simulation is as in the table indicated in FIG. 8.

Specifically, the maximum stress exerted on the first adhesive layer 31 was 0.785 MPa and the maximum stress exerted on the second adhesive layer 32 was 0.670 MPa. In contrast, in a model 1B (see FIG. 9) of a capacitive sensor according to a comparative example, the maximum stress exerted on an adhesive layer 31A was 0.892 MPa. As illustrated in FIG. 9, the model 1B of the capacitive sensor according to the comparative example has the sensor substrate 2, panel 3, and adhesive layer 31A. That is, the model 1B of the capacitive sensor according to the comparative example lacks an intermediate layer. Therefore, one adhesive layer 31A is provided between the sensor substrate 2 and the panel 3. That is, the functions of the adhesive layer 31A are not separated. The conditions of the base material of the sensor substrate 2, the panel 3, and the adhesive layer 31A in the model 1B in the comparative example are respectively the same as the conditions of the base material 21 of the sensor substrate 2, panel 3, and first adhesive layer 31, which have been described in relation to FIG. 6.

According to the results in this simulation, the maximum stress (0.785 MPa) exerted on the first adhesive layer 31 was reduced by 12% when compared with the maximum stress (0.892 MPa) exerted on the adhesive layer 31A of the model 1B in the comparative example. The maximum stress (0.670 MPa) exerted on the second adhesive layer 32 was reduced by 24.9% when compared with the maximum stress (0.892 MPa) exerted on the adhesive layer 31A of the model 1B in the comparative example. Thus, it was found that when the capacitive sensor 1 has the intermediate layer 40 and the intermediate layer 40 causes the first adhesive layer 31 and second adhesive layer 32 to function independently on both sides of the intermediate layer 40, the maximum stress exerted on the first adhesive layer 31 and second adhesive layer 32 can be reduced.

Next, another simulation performed by the present inventor will be described with reference to drawings.

FIG. 10 is a table that lists members of a model in the other simulation performed by the present inventor. FIG. 11 is a table that lists an example of results in the other simulation.

As illustrated in FIG. 10, in this simulation, the thicknesses of the first adhesive layer 31 and second adhesive layer 32 are 0.4 mm. The thicknesses of other members are the same as the thicknesses of the relevant members in the simulation described above in relation to FIGS. 5 to 9. Similarly, the Young's modulus, Poisson's ratio, and linear expansion coefficient of each member are the same as the Young's modulus, Poisson's ratio, and linear expansion coefficient of the relevant member in the simulation described above in relation to FIGS. 5 to 9. Constraint conditions are also the same as the constraint conditions in the simulation described above in relation to FIGS. 5 to 9. That is, this simulation differs from the simulation described above in relation to FIGS. 5 to 9 in the thicknesses of the first adhesive layer 31 and second adhesive layer 32.

An example of results in this simulation is as indicated in FIG. 11. Specifically, the maximum stress exerted on the first adhesive layer 31 was 0.320 MPa and the maximum stress exerted on the second adhesive layer 32 was 0.257 MPa. Since the first adhesive layer 31 and second adhesive layer 32 became thicker, the first adhesive layer 31 can absorb more deformation between the panel 3 and the intermediate layer 40 and the second adhesive layer 32 can also absorb more deformation between the intermediate layer 40 and the base material 21 of the sensor substrate 2. Thus, even if environment temperature changes, the resulting stress exerted on the first adhesive layer 31 and second adhesive layer 32 can be suppressed.

According to the results in this simulation, the maximum stress (0.320 MPa) exerted on the first adhesive layer 31 was reduced by 64.1% when compared with the maximum stress (0.892 MPa) exerted on the adhesive layer 31A of the model 1B in the comparative example. The maximum stress (0.257 MPa) exerted on the second adhesive layer 32 was reduced by 71.2% when compared with the maximum stress (0.892 MPa) exerted on the adhesive layer 31A of the model 1B in the comparative example. Thus, it was found that when the capacitive sensor 1 has the intermediate layer 40 and the first adhesive layer 31 and second adhesive layer 32 become thicker, the maximum stress exerted on the first adhesive layer 31 and second adhesive layer 32 can be more reduced.

So far, this embodiment and its application examples have been described. However, the present invention is not limited to these examples. For example, the scope of the present invention also includes embodiments obtained as a result of adding or deleting constituent element to or from the above embodiment or its application examples, performing design changes to the above embodiment or its application examples, or appropriately combining features in embodiments; the addition, deletion, design change, or combination is effected by a person having ordinary skill in the art without departing from the intended scope of the present invention.

For example, in the embodiment described above, the decorative layer 9 has been disposed over the whole of the portion, on the rear surface 3b of the panel 3, in which the non-detection area 25 is located, and the whole of the non-detection area 25 has been light-shielded, but the present invention is not limited to this. The portion, on the rear surface 3b of the panel 3, in which the non-detection area 25 is located may include a portion in which the decorative layer 9 is not present. Also, although the decorative layer 9 has been disposed on the rear surface 3b of the panel 3, the present invention is not limited to this; the decorative layer 9 is only required to be positioned between the panel 3 and the base material 21. For example, the decorative layer 9 may be buried in the first adhesive layer 31.

What is claimed is:

1. A capacitive sensor comprising:
    a panel made of a resin having a translucent property, a first main surface of the panel being a manipulation surface;
    a sensor substrate facing a second main surface of the panel opposite to the first main surface, the sensor substrate having a base made of glass, and a transparent electrode provided on at least one main surface of the base;
    an intermediate layer made of polyethylene terephthalate (PET) and having a translucent property, the intermediate layer being disposed between the panel and the sensor substrate;
    a first adhesive layer disposed between the panel and the intermediate layer, the first adhesive layer including an acrylic adhesive resin and bonding the panel and the intermediate layer together; and
    a second adhesive layer disposed between the sensor substrate and the intermediate layer, the second adhesive layer including an acrylic adhesive resin and bonding the sensor substrate and the intermediate layer together,
    wherein the intermediate layer provides a substantially rigid boundary between the first and second adhesive layers, thereby dividing the first adhesive layer and the second adhesive layer such that the first and second adhesive layers deform independently to each other, the intermediate layer having a linear expansion coefficient which is greater than a linear expansion coefficient of the base and is smaller than a linear expansion coefficient of the panel.

2. The capacitive sensor according to claim 1, wherein a Young's modulus of the intermediate layer is smaller than a Young's modulus of the base and is greater than a Young's modulus of the panel.

3. The capacitive sensor according to claim 2, wherein a Young's modulus of the first adhesive layer and a Young's modulus of the second adhesive layer are smaller than the Young's modulus of the panel, the Young's modulus of the base, and the Young's modulus of the intermediate layer.

4. The capacitive sensor according to claim 1, wherein a Young's modulus of the intermediate layer is smaller than a Young's modulus of the base and is greater than a Young's modulus of the panel.

5. The capacitive sensor according to claim 4, wherein a Young's modulus of the first adhesive layer and a Young's modulus of the second adhesive layer are smaller than the Young's modulus of the panel, the Young's modulus of the base, and the Young's modulus of the intermediate layer.

6. The capacitive sensor according to claim 1, wherein the intermediate layer substantially confines a shearing force applied from the panel to the first adhesive layer within the first adhesive layer, and substantially confines a shearing force applied from the sensor substrate to the second adhesive layer within the second adhesive layer, thereby preventing the first adhesive layer from peeling off from the panel and preventing the second adhesive layer from peeling off from the sensor substrate.

* * * * *